United States Patent
Caruso et al.

(10) Patent No.: US 10,138,867 B2
(45) Date of Patent: Nov. 27, 2018

(54) METHODS FOR ASSEMBLING ROTOR BLADES

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 450 days.

(21) Appl. No.: 14/852,910

(22) Filed: Sep. 14, 2015

(65) Prior Publication Data
US 2017/0074239 A1    Mar. 16, 2017

(51) Int. Cl.
| | |
|---|---|
| *F03D 1/06* | (2006.01) |
| *F03D 13/40* | (2016.01) |
| *B60P 7/12* | (2006.01) |
| *B60P 3/40* | (2006.01) |

(52) U.S. Cl.
CPC ........... *F03D 1/0675* (2013.01); *F03D 13/40* (2016.05); *B60P 3/40* (2013.01); *B60P 7/12* (2013.01); *F05B 2230/60* (2013.01); *Y10T 29/49337* (2015.01); *Y10T 29/49895* (2015.01)

(58) Field of Classification Search
CPC .... F03D 1/0675; F03D 13/40; F05B 2230/60; B60P 7/12; B60P 3/40; Y10T 29/49336–29/49343; Y10T 29/37; Y10T 29/49895–29/49902; Y10T 29/4932; Y10T 29/53978; Y02E 10/70–10/766
See application file for complete search history.

(56) References Cited

U.S. PATENT DOCUMENTS

| | | | |
|---|---|---|---|
| 2,372,929 A | * | 4/1945 | Blessing .................. B27D 1/04 156/273.9 |
| 6,264,877 B1 | | 7/2001 | Pallu De La Barriere |
| 8,317,479 B2 | | 11/2012 | Vronsky et al. |
| 8,657,581 B2 | | 2/2014 | Pilpel et al. |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

*Primary Examiner* — Sarang Afzali
(74) *Attorney, Agent, or Firm* — Dority & Manning, PA

(57) ABSTRACT

Methods for assembling rotor blades are provided. A method includes receiving a first portion of a rotor blade at an erection site. The method further includes receiving a second portion of the rotor blade at the erection site. The method further includes aligning the first portion and the second portion at the erection site, the first portion and the second portion supported on a fixture system when aligned. The method further includes connecting a blade component of the first portion and a blade component of the second portion together at the erection site.

15 Claims, 9 Drawing Sheets

(56) References Cited

U.S. PATENT DOCUMENTS

| | | |
|---|---|---|
| 8,673,106 B1 | 3/2014 | Jolley et al. |
| 8,747,098 B1 | 6/2014 | Johnson et al. |
| 8,961,142 B2 | 2/2015 | Wansink |
| 8,992,813 B2 | 3/2015 | Robbins et al. |
| 9,145,867 B2 | 9/2015 | Busbey et al. |
| 2009/0148300 A1 | 6/2009 | Driver et al. |
| 2010/0062238 A1* | 3/2010 | Doyle ............... B29C 70/02 428/295.1 |
| 2011/0097211 A1 | 4/2011 | Rudling |
| 2012/0124833 A1* | 5/2012 | Arendt ............... F03D 13/10 29/889.7 |
| 2013/0164133 A1 | 6/2013 | Grove-Nielsen |
| 2014/0295187 A1 | 10/2014 | Jacobsen et al. |
| 2016/0377052 A1 | 12/2016 | Caruso et al. |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

\* cited by examiner

METHODS FOR ASSEMBLING ROTOR BLADES

FIELD OF THE INVENTION

The present disclosure relates generally to rotor blades, such as wind turbine rotor blades, and more particularly to methods for assembling rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

Additionally, two options are typically available for transporting a rotor blade to an erection site, i.e. the site at which the associated wind turbine is assembled. One option is to assemble the entire rotor blade (from root to tip) at a manufacturing site and then transport this rotor blade to the erection site. Transportation of such rotor blades is logistically difficult, time consuming and expensive due to the length of the rotor blades. A second option is to assemble portions of the rotor blade at a manufacturing site, transport these portions separately to the erection site, and connect the portions together at the erection site. While this approach reduces the logistical difficulties, time and expense associated with transportation, presently known techniques for assembling the rotor blade portions at the erection site are difficult and time-consuming, requiring for example the application of bonding pastes, etc.

Accordingly, improved methods for assembling rotor blades are desired. In particular, methods for assembling rotor blades which reduce the logistical difficulties, time and expense associated with transportation and assembly would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for assembling a rotor blade is provided. The method includes receiving a first portion of a rotor blade at an erection site, wherein the first portion is a root portion or a tip portion. The method further includes receiving a second portion of the rotor blade at the erection site. The method further includes aligning the first portion and the second portion at the erection site, the first portion and the second portion supported on a fixture system, the fixture system including a first cradle assembly supporting the first portion and a second cradle assembly supporting the second portion. The method further includes welding a spar cap of the first portion and a spar cap of the second portion together at the erection site, the spar cap of the first portion and the spar cap of the second portion each including a thermoplastic resin. The method further includes connecting a blade segment of the first portion and a blade segment of the second portion together at the erection site.

In accordance with another embodiment, a method for assembling a rotor blade is provided. The method includes receiving a first portion of a rotor blade at an erection site, wherein the first portion is, when received at the erection site, supported on a first cradle assembly of a fixture system, the first cradle assembly supported on a transportation vehicle. The method further includes receiving a second portion of the rotor blade at the erection site. The method further includes aligning the first portion and the second portion at the erection site, the first portion and the second portion supported on the fixture system when aligned. The method further includes connecting a blade component of the first portion and a blade component of the second portion together at the erection site.

In accordance with another embodiment, a method for assembling a rotor blade is provided. The method includes receiving a first portion of a rotor blade at an erection site, and receiving a second portion of a rotor blade at the erection site. The method further includes receiving a fixture system at the erection site separately from the first portion and the second portion, the fixture system including a first cradle portion and a second cradle portion, the fixture system at least partially supported on a transportation vehicle when received. The method further includes aligning the first portion and the second portion at the erection site, the first portion and the second portion supported on the fixture system when aligned, the fixture system at least partially supported on the transportation vehicle when the first portion and the second portion are aligned. The method further includes connecting a blade component of the first portion and a blade component of the second portion together at the erection site.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
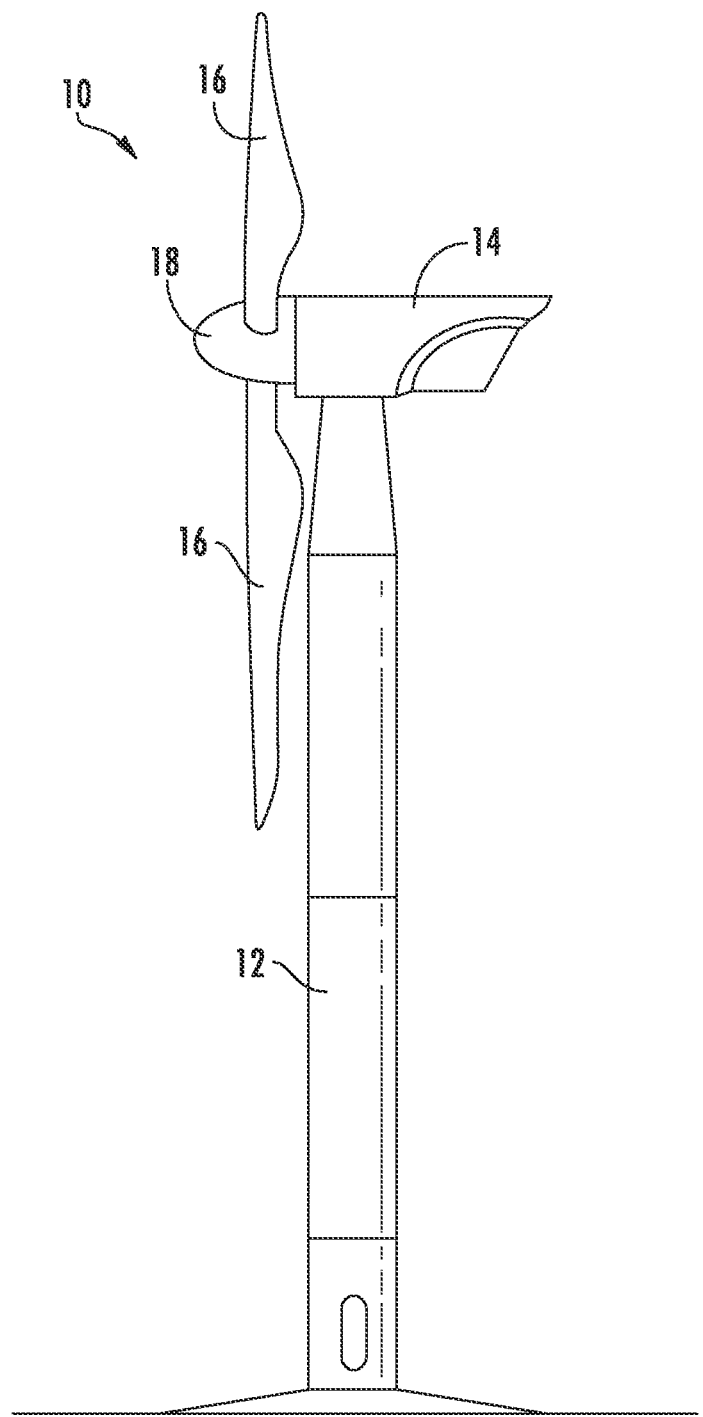
FIG. 1 is a perspective view of a wind turbine in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The rotor blades 16 are considered to be uptower due to being erected on the tower 12 and wind turbine 10 generally, which is illustrated at an erection site for the wind turbine 10. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
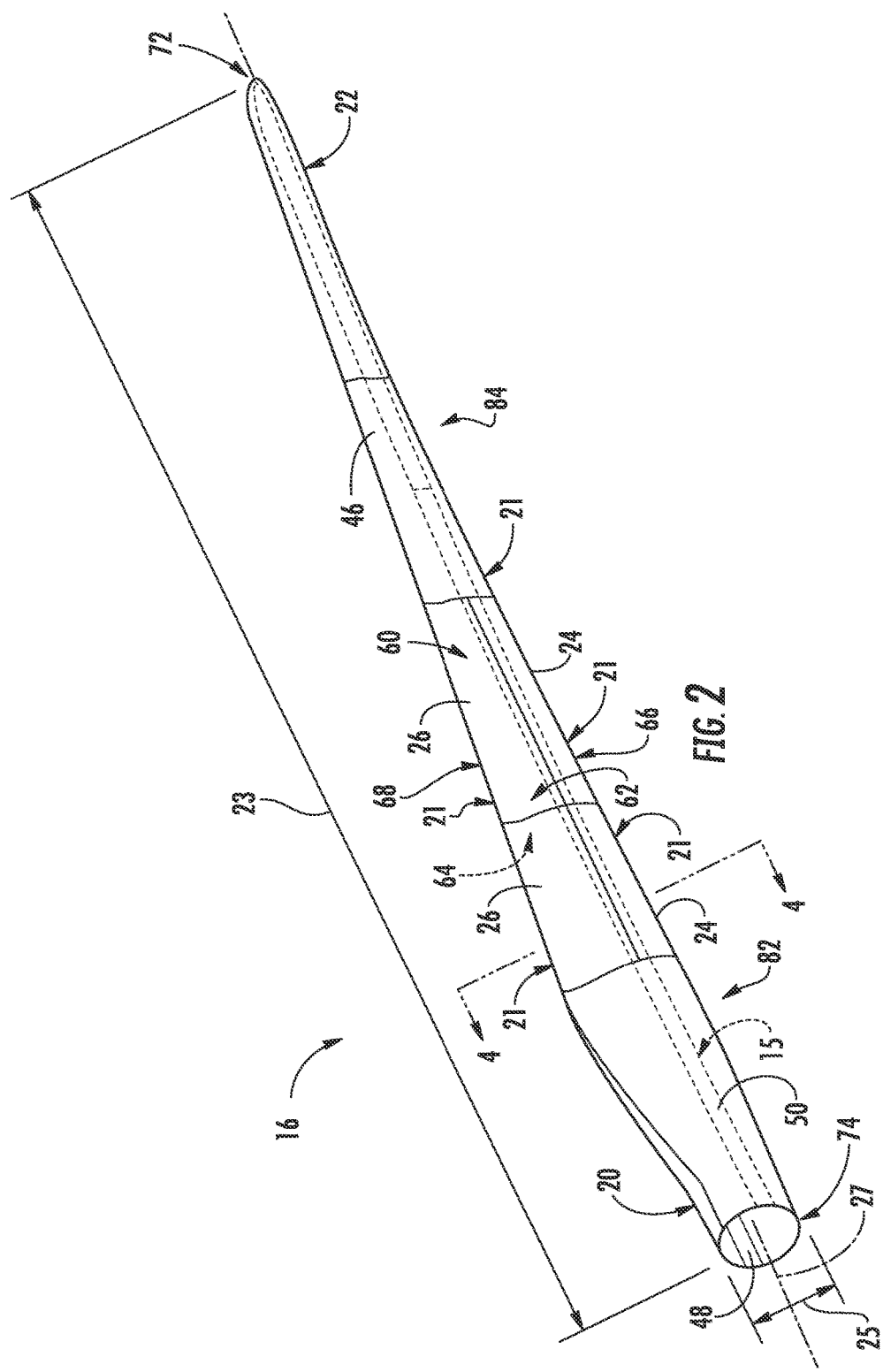
FIG. 2 is a perspective view of a formed rotor blade in accordance with one embodiment of the present disclosure.
Figure 3:
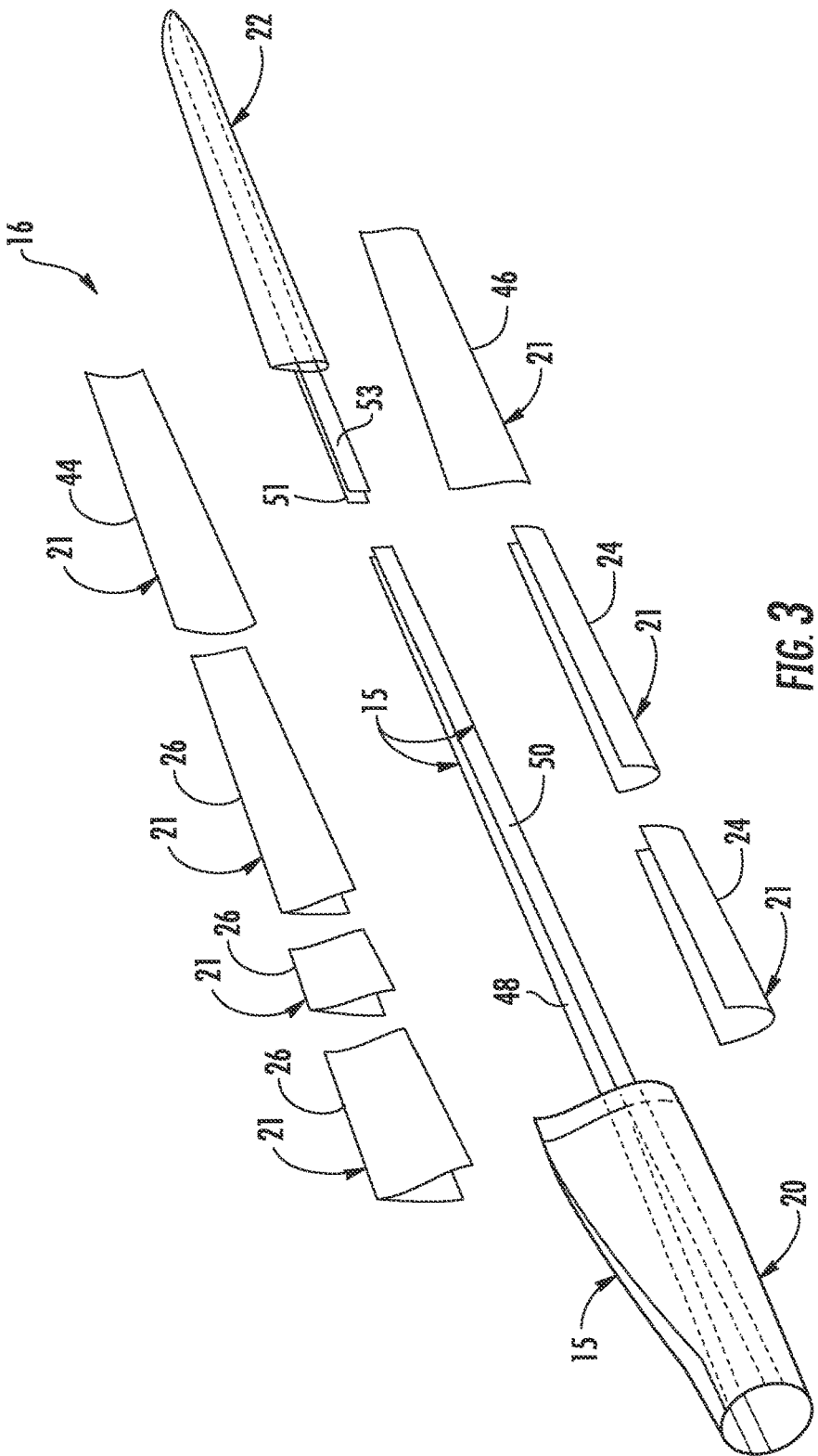
FIG. 3 is an exploded view of the rotor blade of FIG. 2.

Referring now to FIGS. 2 and 3, various views of rotor blades 16 according to the present disclosure are illustrated. As is generally understood, a rotor blade 16 according to the present disclosure may include an exterior surface 60 defining a pressure side 62, a suction side 64, a leading edge 66, and a trailing edge 68. The pressure side 62 and suction side 64 may each extend between the leading edge 66 and the trailing edge 68. The exterior surface 60 may extend between a blade tip 72 and a blade root 74 in a generally span-wise direction, as discussed below.

The pressure side, suction side, leading edge and trailing edge may be generally aerodynamic surfaces having generally aerodynamic contours, as is generally known in the art. Thus, the exterior surface of the rotor blade 16 may define an aerodynamic profile, such as an airfoil-like cross-sectional profile, for the rotor blade 16. The aerodynamic profile includes the pressure side, suction side, leading edge and trailing edge.

The rotor blade 16 may, in some embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 23 and a span 25 extending in chord-wise and span-wise directions, respectively. The chord may vary throughout the span of the rotor blade 16. Thus, a local chord may be defined for the rotor blade 16 at any point on the rotor blade 16 along the span.

Figure 4:
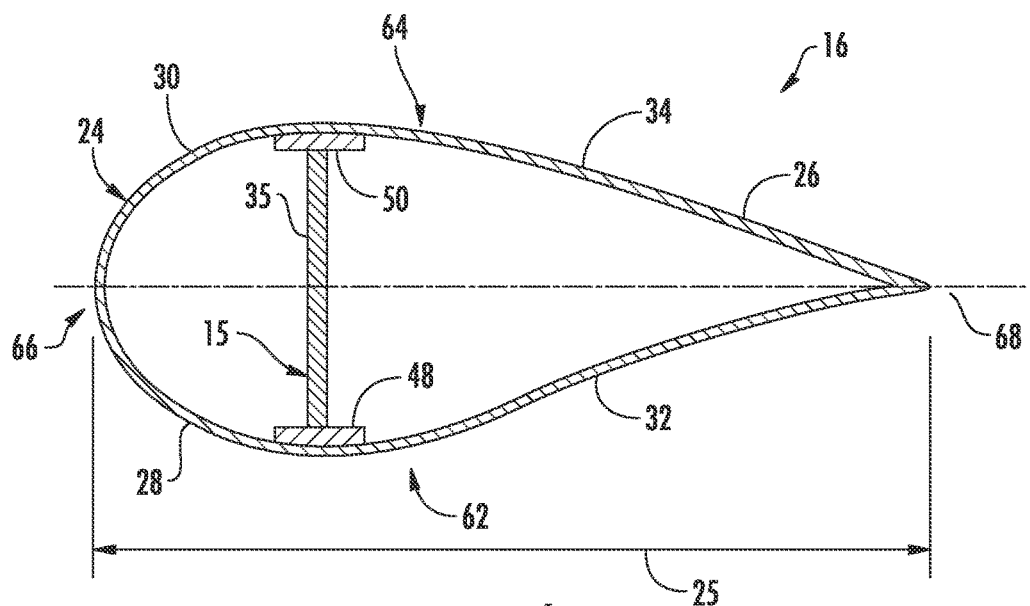
FIG. 4 is a cross-sectional view, along the line 4-4 of FIG. 2, of a rotor blade in accordance with one embodiment of the present disclosure.

Additionally, as shown in FIGS. 2, 3 and 4, the rotor blade 16 may define an inboard portion 82 and an outboard portion 84. The inboard portion may be a span-wise portion of the rotor blade 16 extending from the root. For example, the inboard portion may, in some embodiments, include approximately 33%, 40%, 50%, 60%, 67%, or any percentage or range of percentages therebetween, or any other suitable percentage or range of percentages, of the span from the root. The outboard portion may be a span-wise portion of the rotor blade 16 extending from the tip, and may in some embodiments include the remaining portion of the rotor blade 16 between the inboard portion and the tip. Additionally or alternatively, the outboard portion may, in some embodiments, include approximately 33%, 40%, 50%, 60%, 67%, or any percentage or range of percentages therebetween, or any other suitable percentage or range of percentages, of the span from the tip.

As shown in FIGS. 2 and 3, a rotor blade 16 in accordance with the present disclosure includes a main blade structure 15 constructed, at least in part, from a thermoset or a thermoplastic resin and at least one outer blade segment 21 configured with the main blade structure 15. More specifically, as shown, the rotor blade 16 includes a plurality of outer blade segments 21. The blade segment(s) 21 may also be constructed, at least in part, from a thermoset or a thermoplastic resin. The thermoplastic and/or the thermoset resin as described herein may optionally be reinforced with a fiber material, including but not limited to glass fibers, carbon fibers, metal fibers, or similar or combinations thereof, embedded in the resin to form a composite. Continuous or discontinuous fibers may be utilized. In exemplary embodiments, continuous fibers are utilized. The direction of the fibers may include biaxial, unidirectional, triaxial, or any other another suitable direction and/or combinations thereof. Further, the fiber content within a composite may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIG. 4), and/or any other suitable structural component of the rotor blade 16. Further, the blade root section 20 is configured to be mounted or otherwise secured to the rotor 18 (FIG. 1). As mentioned, the rotor blade 16 defines a span 23 that is equal to the total length between the blade root section 20 and the blade tip section 22. The rotor blade 16 also defines a chord 25 that is equal to the total length between a leading edge 66 of the rotor blade 16 and a trailing edge 68 of the rotor blade 16. As is generally understood, the chord 25 may generally vary in length with respect to the span 23 as the rotor blade 16 extends from the blade root section 20 to the blade tip section 22.

In some embodiments, as shown in FIGS. 2-3, the main blade structure 15 may include the blade root section 20 with one or more longitudinally extending spar caps 48, 50 infused therewith. For example, the blade root section 20 may be configured according to U.S. application Ser. No. 14/753,155 filed Jun. 29, 2015 entitled "Blade Root Section for a Modular Rotor Blade and Method of Manufacturing Same" which is incorporated by reference herein in its entirety. Similarly, the main blade structure 15 may include the blade tip section 22 with one or more longitudinally extending spar caps 51, 53 infused therewith. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof.

In addition, as shown in FIG. 4, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22.

Referring to FIGS. 2-4, any number of outer blade segments 21 having any suitable size and/or shape may be generally arranged between the blade root section 20 and the blade tip section 22 along a longitudinal axis 27 in a generally span-wise direction. The blade segments 21 generally serve as the outer casing/covering of at least a portion of the rotor blade 16 (such as between the blade root section 20 and the blade tip section 22) and may define a generally aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. As mentioned, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure side segments, suction side segments 46, leading edge segments 24 and/or trailing edge segments 26.

More specifically, as shown in FIG. 4, the leading edge segments 24 may have a forward pressure side surface 28 and a forward suction side surface 30. Similarly, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

As discussed, the various blade components of the rotor blade 16, such as the main blade structure 15 and/or the various blade segments 21, may include a thermoset resin and/or a thermoplastic resin. Thermoplastic resins as described herein generally encompass a plastic material or polymer that is reversible in nature. For example, thermoplastic resins typically become pliable or moldable when heated to a certain temperature and return to a more rigid, solidified state upon cooling. Further, thermoplastic resins may include amorphous thermoplastic resins and/or semi-crystalline thermoplastic resins. For example, some amorphous thermoplastic resins may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, example semi-crystalline thermoplastic resins may generally include, but are not limited to, polyolefins, polyamides, fluropolymers, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset resins as described herein generally encompass a plastic material or polymer that is non-reversible in nature. For example, thermoset resins, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset materials.

Figure 5:
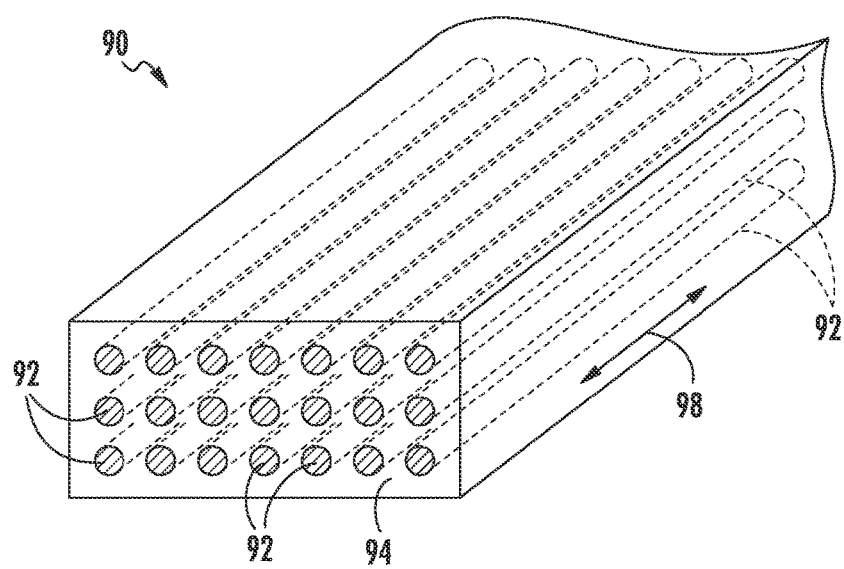
FIG. 5 is a perspective view of a portion of a composite utilized in various components of a rotor blade assembly in accordance with one embodiment of the present disclosure.

Referring briefly to FIG. 5, an embodiment of a composite 90 utilized in accordance with the present disclosure is provided. As illustrated, the composite 90 generally includes a resin 92 (which may be a thermoset or thermoplastic) and a plurality of fibers 94 embedded therein. In exemplary embodiments the fibers 94 are continuous, generally unidirectional fibers which extend along a longitudinal axis 98 as illustrated. Alternatively, discontinuous fibers may be utilized, and/or the fibers may extend at any suitable angles.

Referring now to FIGS. 6 through 10, various apparatus and techniques for assembling a rotor blade 16 in accordance with the present disclosure are provided. In general, assembly of a rotor blade 16 in accordance with the present disclosure includes connecting a root portion 86 and a tip portion 88, as well as optional intermediate portions such as inserts (not shown) together. The portions 86, 88 may initially be formed separately from each other at a formation site(s) for the rotor blade 16, such as a manufacturing facility. The portions 86, 88 may then be transported via suitable transportation vehicles, which may be ground, air and/or water-based, from the formation site(s) to an erection site. The formation site is generally a separate site from an erection site at which the wind turbine 10 is erected.

Root portion 86 may include, for example, a span-wise portion of the rotor blade 16 extending from the root 74, while tip portion 88 may include, for example, a span-wise portion of the rotor blade 16 extending from the tip 72. In exemplary embodiments, root portion 86 may for example include the inboard portion 82, while tip portion 88 includes the outboard portion 84.

Figure 6:
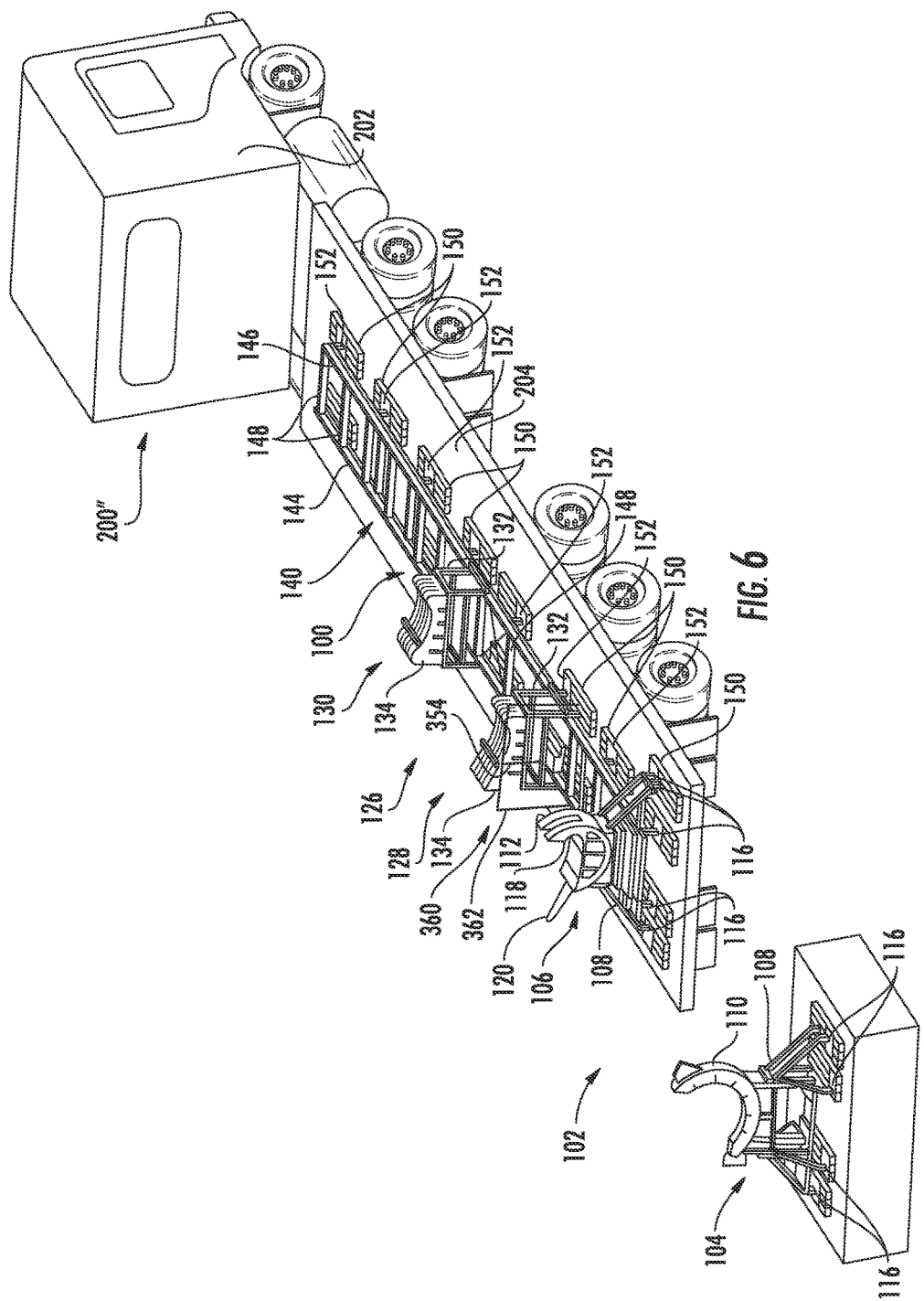
FIG. 6 is a perspective view of a fixture system partially supported on a transportation vehicle in accordance with one embodiment of the present disclosure.
Figure 7:
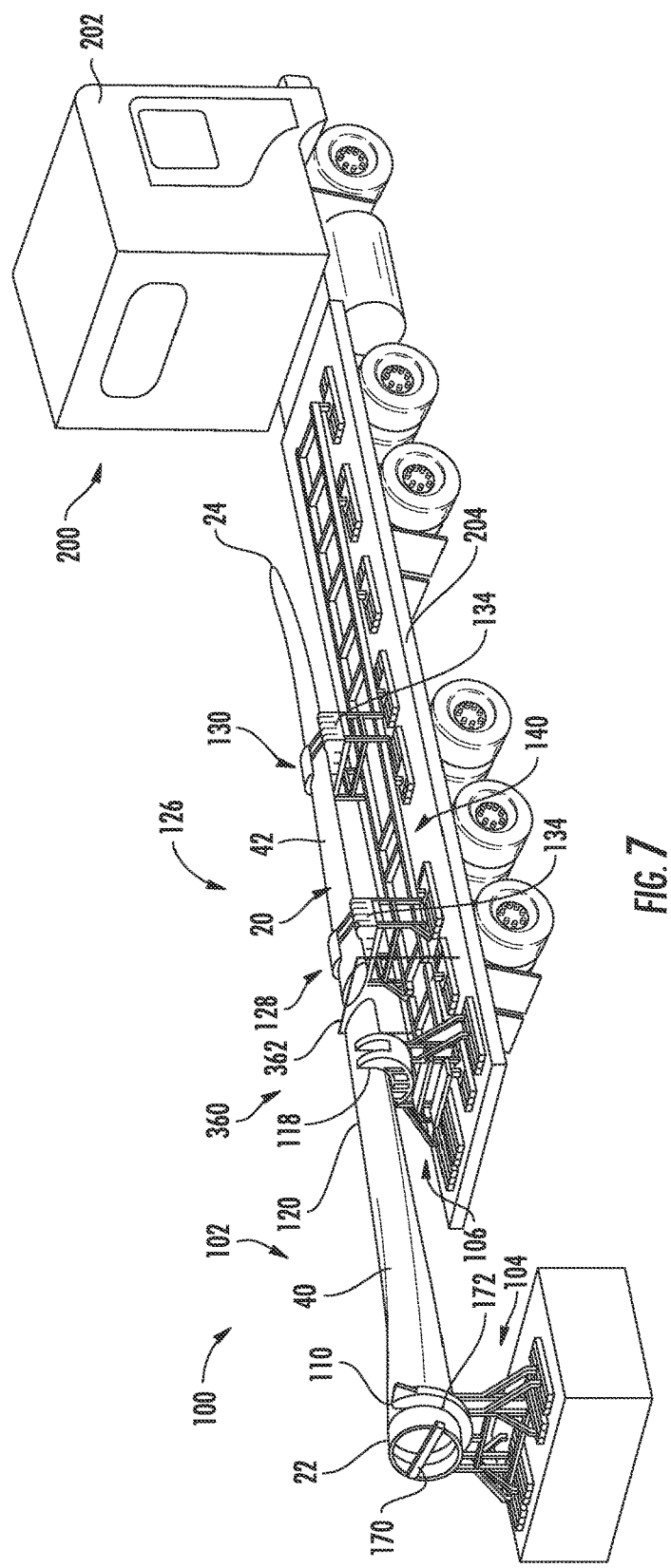
FIG. 7 is a perspective view of portions of a rotor blade supported on a fixture system, which in turn is supported on a transportation vehicle, in accordance with one embodiment of the present disclosure.
Figure 8:
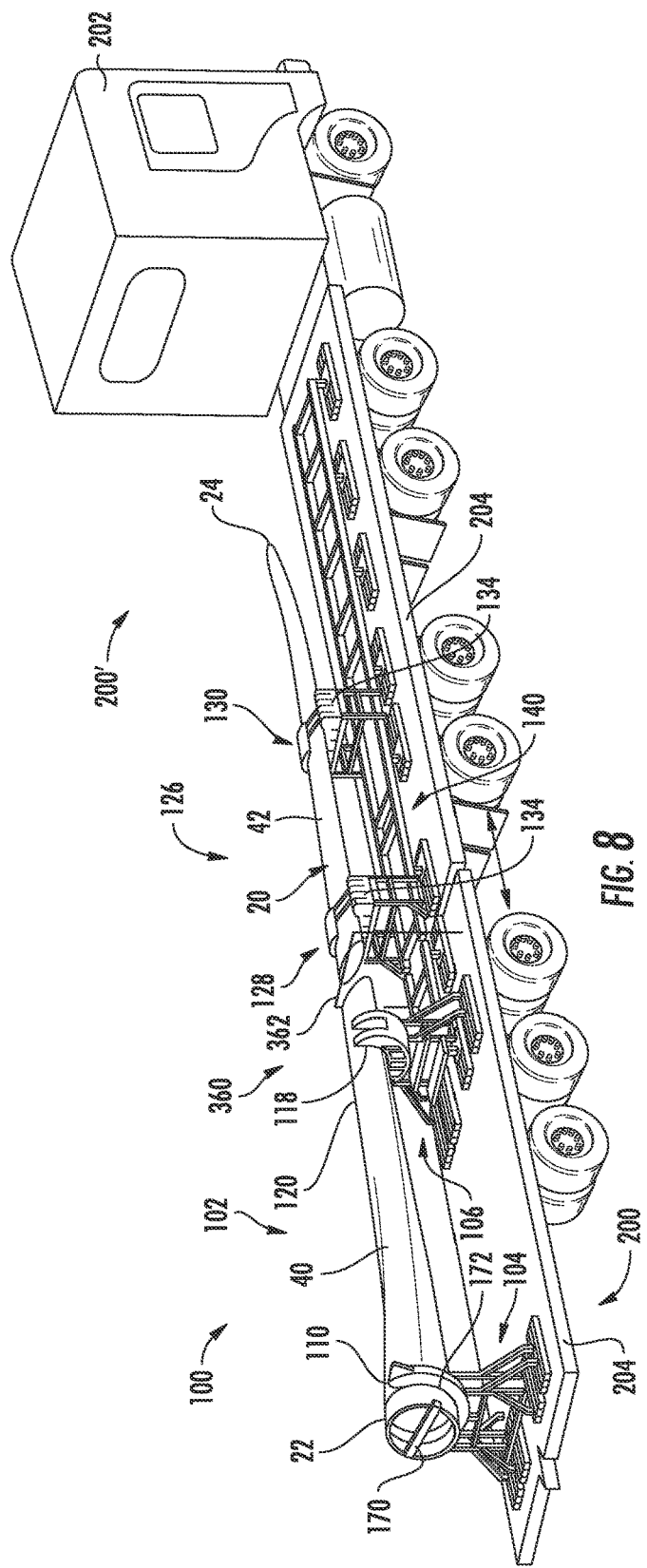
FIG. 8 is a perspective view of portions of a rotor blade supported on a fixture system, which in turn is supported on a plurality of transportation vehicles, in accordance with one embodiment of the present disclosure.

Referring to FIGS. 6 through 8, various transportation vehicles 200 are illustrated. In exemplary embodiments, a transportation vehicle 200 is a truck, as illustrated. Any suitable truck 200 is within the scope and spirit of the present disclosure. For example, the truck 200 may generally have a cab 202 and a bed 204, such as a trailer. The bed 204 may be a separate component from the cab 202 that is hitched to the cab 202 for transportation, or the bed 204 and cab 202 may be attached. The bed 204 may be of suitable size, and include suitable components and accessories, for accommodating and transporting the components discussed herein thereon. Alternatively, any suitable transportation vehicle, such as a ship or plane, may be utilized to transport a component as discussed herein.

FIGS. 6 through 8 further illustrate a fixture system 100 in accordance with the present disclosure. As discussed herein, fixture system 100 or portions thereof may be supported on transportation vehicles 200 to support portions 86, 88 of the rotor blade 16 during shipping to the erection site, or may be shipped to the erection site separately from the portions 86, 88 of the rotor blade 16. Fixture system 200 may generally support the portions 86, 88 for assembly thereof at the erection site.

As shown, the disclosed system 100 may generally include various cradle assemblies for supporting various portions, such as the root and tip portions 86, 88 as shown, while the portions are being assembled together. For example, the system 100 may include a first cradle assembly 102 for supporting a first portion of the rotor blade 16, which in exemplary embodiments may be a root cradle assembly 102 for supporting a root portion 86 of the blade 16. The root cradle assembly 102 may include a first root cradle 104 and a second root cradle 106. The first root cradle 102 may generally be configured to support a section of the root portion 86 disposed at and/or adjacent to the blade root 74. Similarly, the second root cradle 104 may generally be configured to support a second, more outboard section of the root portion 86. However, in alternative embodiments, the root cradle assembly 102 may simply include a single root cradle configured to support the root portion 86 or the root cradle assembly 102 may include three or more root cradles configured to support various difference sections of the root portion 86.

Each root cradle 104, 106 may generally include a stationary base frame 108 and a root nest 110, 112 supported by the base frame 108. Each base frame 108 may generally serve as the primary structural component for supporting both the root nest 110, 112 and the root portion 86 relative to the ground. Thus, each base frame 108 may generally include a plurality of structural members coupled to one another to form a suitable support structure. Additionally, as shown in FIG. 3, each base frame 108 may also include a plurality of leveling members 116 (e.g., screw jacks, leveling pads, etc.) extending from the bottom thereof to permit the root cradles 104, 106 to be leveled relative to the ground. For example, as is generally understood, a height of the leveling members 116 may be manually and/or automatically adjustable to permit the root cradles 104, 106 to be leveled.

The root nest 110, 112 of each root cradle 104, 106 may generally be configured to receive and/or support a section of the root portion 40 of the rotor blade 20. For example, as indicated above, the first root cradle 104 may generally be configured to support the root portion 86 at and/or adjacent to the blade root 74. Thus, the root nest 110 for the first root cradle 104 may define a semi-circular shape such that the circular section of the root portion 40 defined at and/or adjacent to the blade root 74 may be received within and/or supported by the root nest 110. Similarly, as indicated above, the second root cradle 106 may be configured to support the root portion 86 at a more outboard location relative to the blade root 74 (e.g., at a location at which the shape of the root portion 86 has transitioned from the circular blade root 74 to a more aerodynamic shape). Thus, as shown, the root nest 112 for the second root cradle 106 may define a rounded-off cavity 118 and may also include an extension arm 120 extending opposite the cavity 118. As such, when the root portion 86 is positioned onto and/or within the root nest 112, the leading edge of the root portion 86 may be received within the cavity 118 and the trailing edge of the root portion 86 may be supported by the extension arm 120.

Additionally, in several embodiments, each root nest 110, 112 may be configured to be rotated relative to its corresponding base frame 108. For example, in one embodiment, one or more rollers or other suitable rotational devices may be coupled between each root nest 110, 112 and base frame 108 to allow for relative rotational movement. Such relative rotational movement may allow for the rotor blade 16 to be initially supported on the root cradles 104, 106 in a first portion (e.g., a generally vertical position) and subsequently rotated to a second position (e.g., a generally horizontal position).

It should be appreciated that the root nests 110, 112 may be configured to be manually or automatically rotated relative to their corresponding base frames 108. For example, in one embodiment, a suitable actuator(s) (e.g., a hydraulic or pneumatic cylinder) may be used to automatically rotate the root nests 110, 112 relative to the base frames 108. In such an embodiment, the actuator(s) may be installed on both root cradles 104, 106 or the actuator(s) 124 may only be installed one of the root cradles 104, 106 (with the other root cradle being rotated as a result of the rotation of the actuated root cradle).

The system 100 may also include a second cradle assembly 126 for supporting a second portion of the rotor blade 16. In exemplary embodiments as shown, the second cradle assembly 126 is a tip cradle assembly 126 for supporting a tip portion 68 of the rotor blade 16. As shown, in one embodiment, the tip cradle assembly 126 may include a first tip cradle 128 and a second tip cradle 130. The first tip cradle 128 may generally be configured to support a first, more inboard section of the tip portion 68 and the second tip cradle 130 may generally be configured to support a second, more outboard section of the tip portion 68. However, in alternative embodiments, the tip cradle assembly 126 may simply include a single tip cradle configured to support the tip portion 68 of the rotor blade 16 or the tip cradle assembly 126 may include three or more tip cradles configured to support the tip portion 68.

Each tip cradle 128, 130 may generally include a base frame 132 and a tip nest 134 supported by the base frame 132. Each base frame 132 may generally serve as the primary structural component for supporting both the tip nest 134 and the tip portion 68 of the rotor blade 16 relative to the ground. Thus, each base frame 132 may generally include a plurality of structural members coupled to one another to form a suitable support structure. Additionally, similar to the base frame 108 for each root cradle 104, 106, each base frame 132 may also include a plurality of leveling members (not shown) (e.g., screw jacks, leveling pads, etc.) extending from the bottom thereof to permit the tip cradles 128, 130 to be leveled relative to the ground (and/or relative to the rail assembly 140 described below). For example, as is generally understood, a height of the leveling members may be manually and/or automatically adjustable to permit the tip cradles 128, 130 to be leveled.

The tip nest 134 of each tip cradle 128, 130 may generally be configured to support a section of the tip portion 68 of the rotor blade 16. For example, as shown, each tip nest 134 may define a semi-airfoil-shaped profile generally matching the aerodynamic profile of the rotor blade 16. As such, the tip portion 68 may be seated or nested flush within the tip nests 134 while it is being supported by the tip cradles 128, 130.

Additionally, in several embodiments, each tip cradle 128, 130 may be coupled to, supported by and/or otherwise associated with any suitable translation or movement device configured for moving the tip cradles 128, 130 relative to the root cradles 104, 106. For example, as shown, the movement device may be a rail assembly 140 on which the tip cradles 128, 130 are movably supported. In such an embodiment, the base frame 132 of each tip cradle 128, 130 may be positioned on the rail assembly 140 in a manner that permits the tip cradles 128, 130 to be moved laterally (i.e., in the direction of arrow 142) along the assembly 140 both towards and away from the root cradles 104, 106.

The rail assembly 140 may include a plurality of laterally extending rails (e.g., a first rail 144 and a second rail 146) and a plurality of cross members 148 extending between the rails 144, 146. The rails 144, 146 may generally correspond to any suitable elongated members along which the tip cradles 128, 130 may be moved (e.g., "I-beam" rails). As such, suitable rollers, casters and/or the like (not shown) may be coupled to the bottom of the base frame 132 of each tip cradle 128, 130 to allow the tip cradles 128, 130 to be moved along the rails 144, 146.

Additionally, as shown in the illustrated embodiment, the rails 144, 146 may be positioned on support pads 150 configured to support the rails 144, 146 relative to the ground. For example, as shown in FIG. 3, the rails 144, 146 are supported on the support pads 150 via suitable leveling members 152 (e.g., screw jacks, leveling pads, etc.) extending between the components. Thus, the height of the leveling members 152 may be manually and/or automatically adjusted to permit the rails 144, 146 to be leveled. Moreover, at least a portion of each rail 144, 146 may be pivotally coupled to the remainder of the rail assembly 140. As such, the rails 144, 146 may be pivoted upwards relative to the ground, thereby allowing both the tip cradles 128, 130 and the tip portion 68 of the rotor blade 16 to be moved to an angled orientation relative to both the root cradles 104, 106 and the root portion 66 of the rotor blade 16.

Moreover, in some embodiments, at least a portion of the root cradle assembly 102 may be disposed adjacent to, supported by and/or otherwise associated with a portion of the rail assembly 140. For example, as shown, in some embodiments, the second root cradle 106 may be disposed adjacent to and/or coupled to a root end 141 of the rail assembly 140.

It should be appreciated that, as an alternative to the rail assembly 140, system 100 may include any other suitable translation or movement device for moving the tip cradles 128, 130 relative to the root cradles 104, 106. For example, in one embodiment, the movement device may simply be suitable rollers, casters and/or the like coupled to the bottom of each base frame 132 to allow the tip cradles 128, 130 to be rolled or otherwise moved across the ground or any other support surface relative to the root cradles 104, 106.

It should also be appreciated that, although the root cradles 104, 106 are described herein as being stationary, the root cradles 104, 106 may also be configured to be movable. For example, in one embodiment, the root cradles 104, 106 may be positioned on a suitable rail assembly to allow the root cradles 104, 106 to be moved relative to the tip cradles 128, 130.

Another example of a suitable system for assembling rotor blades 16 in accordance with the present disclosure is provided in U.S. patent application Ser. No. 13/803,176, filed Mar. 14, 2013 and entitled "System and Method for Installing a Blade Insert Between Separate Portions of a Wind Turbine Rotor Blade", which is incorporated by reference herein in its entirety.

As further illustrated in FIGS. 6 through 8, various components of the fixture system 100 may be supported on transportation vehicles 200 when received at the erection site. Further, in some embodiments, fixture system 100 may support various portions of the rotor blade 16, such as the root portion 86 and tip portion 88, when received at the erection site. The use of transportation vehicles 200 and fixture systems 100 in accordance with the present disclosure may advantageously decrease the time and expense associated with transportation and assembly of the rotor blades 16.

Accordingly, and referring now to FIGS. 6 through 8 and 11, methods 300 for assembling rotor blades 16 are provided. A method may include, for example, the step 310 of receiving a first portion 86, such as root portion 86, of the rotor blade 16 at the erection site. The first portion 86 may, for example, be supported on a transportation vehicle 200 when received, such as on the bed 204 of a truck 200. Further, in some exemplary embodiments, as illustrated for example in FIGS. 7 and 8, the first portion 86 when received at the erection site may be supported on the first cradle assembly 102, which may in turn be at least partially supported by a transportation vehicle 200. For example, the first cradle 104 and/or second cradle 106 of the first cradle assembly 102 may be supported by the transportation vehicle 200.

Further, in some embodiments, as illustrated in FIG. 7, at least a portion of the second cradle assembly 126 may be supported by the transportation vehicle 200. For example, the first cradle 128 and/or the second cradle 130 may be supported by the transportation vehicle. Alternatively, as illustrated in FIG. 8, at least a portion of the second cradle assembly 126 may be supported by a second transportation vehicle 200'. For example, the first cradle 128 and/or the second cradle 130 may be supported by the second transportation vehicle 200'.

A method 300 may further include, for example, the step 320 of receiving a second portion 88, such as tip portion 88, of the rotor blade 16 at the erection site. The second portion 88 may, for example, be supported on a transportation vehicle 200 when received, such as on the bed 204 of a truck 200. Further, in some exemplary embodiments, as illustrated for example in FIGS. 7 and 8, the second portion 88 when received at the erection site may be supported on the second cradle assembly 126, which may in turn be at least partially supported by a transportation vehicle 200 or 200'. For example, the first cradle 128 and/or second cradle 130 of the second cradle assembly 126 may be supported by the transportation vehicle 200' as illustrated in FIG. 8, or by the transportation vehicle 200.

In alternative embodiments, as illustrated in FIG. 6, method 300 may further include the step 330 of receiving the fixture system 100 at the erection site. The fixture system 100 when received may be separate from the first and second portions 86, 88, and may as illustrated by at least partially supported on a transportation vehicle, such as a third transportation vehicle 200", when received. For example, the second cradle 106, first cradle 128 and second cradle 130 may be supported by the transportation vehicle 200" when received, while the first cradle 104 is independently supported, such as on the ground or another suitable support. Alternatively, the entire fixture system 100 may be supported by transportation vehicle 200".

Method 300 may further include, for example, the step 340 of aligning the first portion 86 and the second portion 88 at the erection site. The first portion 86 and second portion 88 may be aligned such that the portions 86, 88 are in position for being connected to form at least a portion of rotor blade 16. Such alignment may include various steps of moving one or both portions 86, 88 onto fixture system 100 such that they are supported by fixture system 100 and/or adjustment of various components of the fixture system 100.

In exemplary embodiments as illustrated in FIGS. 6-8, the fixture system 100 is at least partially supported by one or more transportation vehicles. For example, FIG. 7 illustrates fixture system 100 at least partially supported by transportation vehicle 200. In this embodiment, first portion 86 has been received in a manner supported by fixture system 100 and transportation vehicle 200. In some embodiments, second portion 88 is also received in a manner supported by fixture system 100 and transportation vehicle 200. Alternatively, second portion 88 is received in a manner supported by a second transportation vehicle 200, and is then moved (via a crane or other suitable apparatus) to the fixture system 100. FIG. 8 illustrates fixture system 100 at least partially supported by transportation vehicles 200 and 200'. In this embodiment, first portion 86 has been received in a manner supported by fixture system 100 and transportation vehicle 200, and second portion 88 has been received in a manner supported by fixtures system 100 and transportation vehicle 200'. The transportation vehicles 200, 200' are then positioned to align the various portions of the fixture system 100 and the portions 86, 88 supported thereby. In FIG. 6, first portion 86 and second portion 88 are received in a manner supported by transportation vehicles 200, 200', and fixture system 100 is received separately from the first portion 86 and second portion 88, such as on a third transportation vehicle 200". The first and second portions 86, 88 are then moved (via a crane or other suitable apparatus) to the fixture system 100.

Notably, in alternative embodiments, the aligning step 340 need not occur with fixture system 100 supported by a transportation vehicle. For example, the fixture system 100 and various components thereof may be moved from transportation vehicle(s) on which they were received to another suitable location at the erection site, such as the ground.

Additionally, leveling members 116 and other suitable adjustment apparatus of the fixture system may be adjusted to align the first and second portions 86, 88 as discussed above. Further, the second cradle assembly 126 may be moved relative to the first cradle assembly 102 to align the first and second portions 86, 88 as discussed above.

Figure 9:
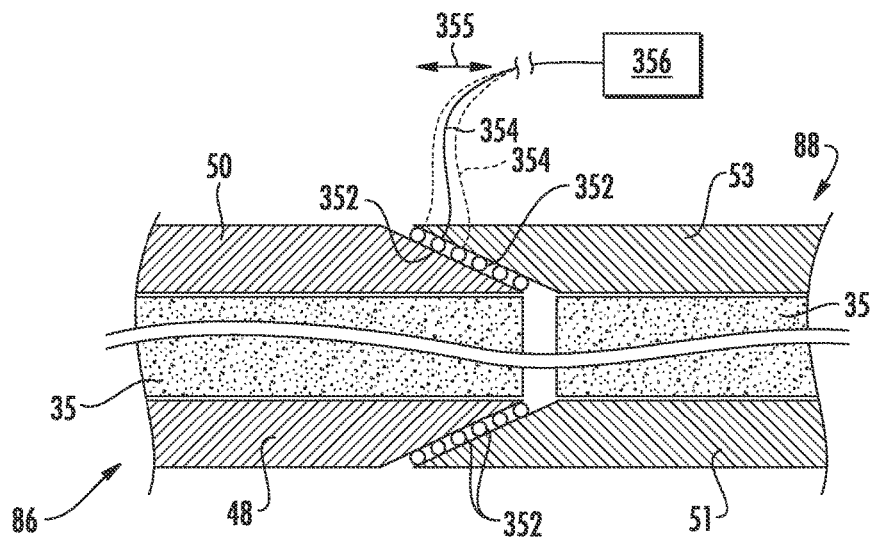
FIG. 9 is a cross-sectional view illustrating the connection of spar caps of a root portion and tip portion of a rotor blade in accordance with one embodiment of the present disclosure.
Figure 10:
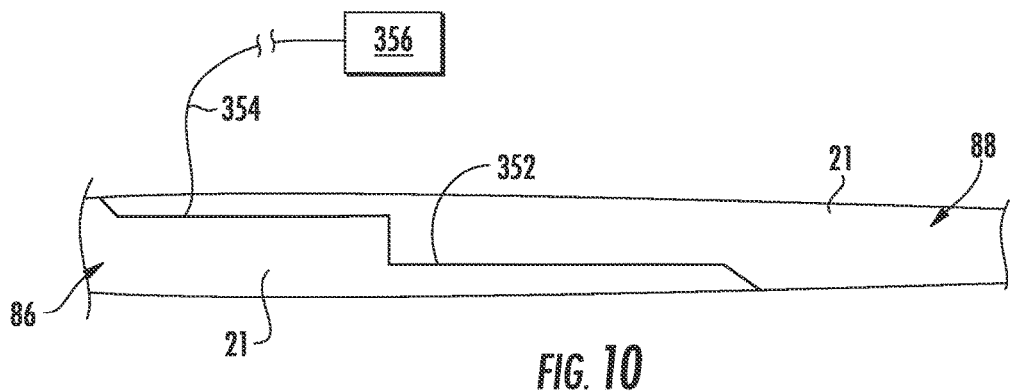
FIG. 10 is a cross-sectional view illustrating the connection of blade segments of a root portion and tip portion of a rotor blade in accordance with one embodiment of the present disclosure.
Figure 11:
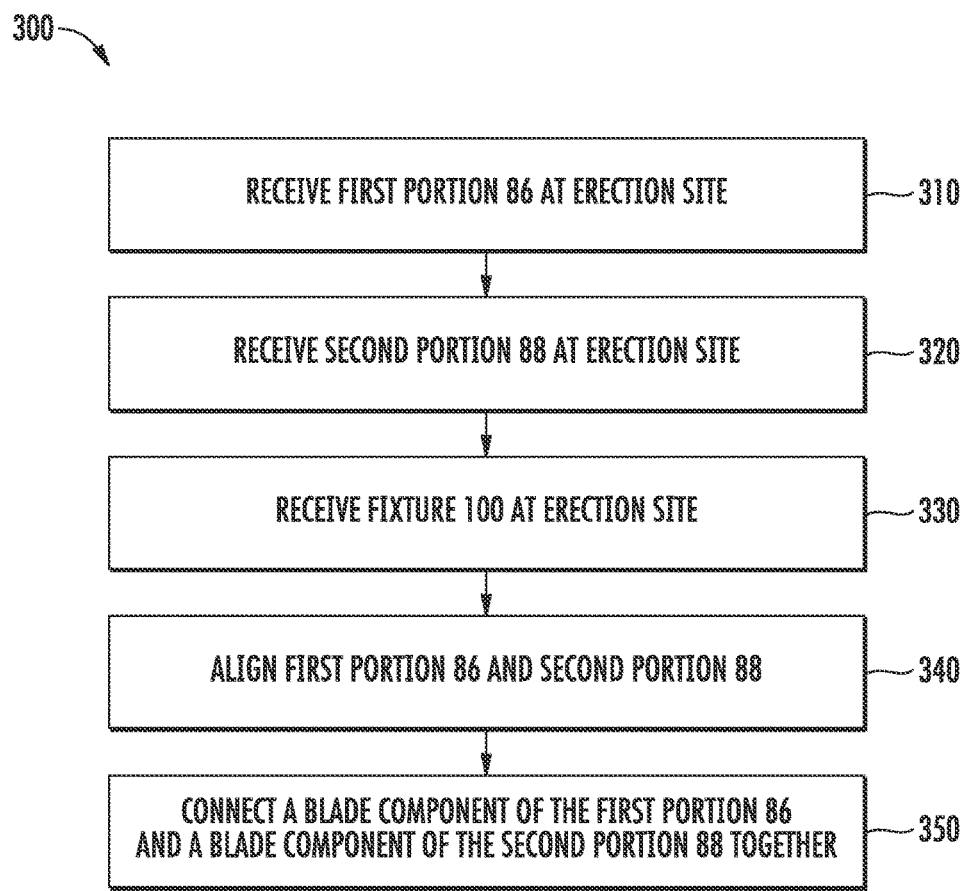
FIG. 11 is a flow chart illustrating a method in accordance with one embodiment of the present disclosure.

Referring now to FIGS. 9, 10 and 11, methods 300 may further include, the step 350 of connecting one or more blade components of the first portion 86 and one or more blade components of the second portion 88 together. Such connecting may occur after the aligning step 340 and at the erection site. The blade components may, for example, be components of the main blade structure 15 of each portion 86, 88, blade segments 21, or other suitable components. In general, like components may be connected to like components. For example, a particular blade segment 21 of the first portion 86 may be connected with a mating blade segment 21 of the second portion 88, and a particular component of the main blade structure 15 of the first portion 86 may be connected with a mating component of the main blade structure 15 of the second portion 88.

For example, in some embodiments, the connecting step may include connecting one or more spar caps 48, 50 of the first portion 86 to one or more spar caps 51, 53 of the second portion 88. Additionally or alternatively, in some embodiments, the connecting step may include connecting one or more blade segments 21 of the first portion 86 to one or more blade segments 21 of the second portion 88 together.

In particular exemplary embodiments, the connecting step may include welding of the one or more blade components of the first portion 86 and one or more blade components of the second portion 88 together. For example, the connecting step may include welding one or more spar caps 48, 50 of the first portion 86 to one or more spar caps 51, 53 of the second portion 88. Additionally or alternatively, in some embodiments, the connecting step may include welding one or more blade segments 21 of the first portion 86 to one or more blade segments 21 of the second portion 88 together.

As discussed, the rotor blade 16 may include a thermoplastic resin. The thermoplastic resin may be included in one or more of the blade components which form the rotor blade 16 and portions 86, 88 thereof, such as the components of the main blade structure 15, the blade segments 21, or other suitable components. A blade component may thus include, and be formed at least partially from, a thermoplastic resin. In some embodiments, the resin may be a neat resin which is free from fibers. In other embodiments, the blade components may include fiber reinforced thermoplastic composites, which may include the thermoplastic resin and a plurality of fibers embedded in the thermoplastic resin as discussed herein.

Notably, a blade component may in exemplary embodiments be formed from a plurality of layers, or plies. One or more of the plies may thus include the thermoplastic resin and/or composite as discussed.

In some embodiments, an entire blade component may include the thermoplastic resin (and, optionally, composite including the thermoplastic resin and fibers). Alternatively, only one or more localized portions of a blade component may include the thermoplastic resin (and, optionally, composite including the thermoplastic resin and fibers). For example, one or more localized portions may include the thermoplastic resin, while the remainder of a blade component may include a thermoset resin (and, optionally, a composite which includes the thermoset resin and fibers embedded therein). At least one localized portion may be a joint portion which is utilized to form a joint connecting a blade component to a mating blade component.

Welding may include welding the thermoplastic resin of the blade components together, such as at a joining location between the components when aligned. Any suitable welding process may be utilized to weld the blade components together. For example, suitable welding techniques may include resistive welding, hot gas welding, speed tip welding, extrusion welding, contact welding, hot plate welding, high frequency welding, induction welding, injection welding, ultrasonic welding, friction welding, laser welding, or solvent welding.

In exemplary embodiments, welding may include heating the thermoplastic resins of the blade components, such as at the joining location between the blade components. Referring now to FIGS. 9 and 10, in some embodiments, a heating element 352, such as a resistive heating element 352, may be provided between the blade components to be connected at a joining location. The heating element 352 may, for example, be embedded in one of the blade components at the joining location or may be disposed on the surface of one of the blade components. An electrical connector 354, which may for example, be a conductive wire or other suitable component configured to transmit electricity therethrough, may be connected to the heating element 352. The electrical connector 354 may be connected to a power source 356 from which the electrical connector 354 receives electricity. Power source 356 may, for example, be an electrical outlet directly connected to the utility grid, astand-alone generator, or another suitable source of electrical power. Electricity being transmitted from the electrical connector 354 to the heating element 352 may cause the heating element 352 to heat up, thus heating the thermoplastic resins of the blade components, such as at the joining location between the blade components. The resins may for example, be heated to above the melting points of the resins in order to facilitate joining thereof via welding.

Referring again to FIGS. 6 through 8, in exemplary embodiments, fixture 100 may include a welding fixture 360 which may be utilized to facilitate welding of the blade components of the first and second portions 86, 88 together. Welding fixture 360 may include a support structure 362, which may include various beams, etc. The support structure 362 may, for example, be rigidly connected to rail assembly 140, support pads 150, or other suitable components of the system 100. When the first and second portions 86, 88 are aligned, the support structure 362 may, for example, surround the joining location between the first and second portions 86, 88. Welding fixture 360 may additionally include the electrical connector 354 and power source 356. For example, and referring now to FIG. 9, electrical connector 354 may be movable relative to the support structure 362, such as along a span-wise direction 355 or other suitable direction. In some embodiments, for example, the electrical connector 354 may be a flexible component such as a wire that is movable, such as rotatable and/or traversable, along direction 355. In other embodiments, welding fixture 360 may further include a rail or other component along which at least a portion of the electrical connector 354 may be traversed in direction 355.

Movement of the electrical connector 354 in accordance with the present disclosure advantageously allows the electrical connector 354 to be connected to multiple heating elements 352. Accordingly, in exemplary embodiments as illustrated in FIG. 9, a plurality of discrete heating elements 352 may be provided between the blade components to be connected at a joining location. The heating elements 352 may, for example, be spaced apart along direction 355. The electrical connector 354 may be connected to a first heating element 352. After suitable heating of the first heating element 352, the electrical connector 354 may be moved in the span-wise direction 355 and connected to a second heating element 352, and so on for each heating element. Such approach may be particularly advantageous when assembling a rotor blade 16 at an erection site, as the size and electrical production of the power source 356 can advantageously be reduced and/or welding can be performed more efficiently.

Notably, in alternative embodiments, multiple discrete heating elements need not be utilized. For example, as illustrated in FIG. 10, a single continuous heating element 352 may be provided between the blade components to be connected at a joining location. When heated due to connection with the electrical connector 354, the heating element 352 may heat the entire desired location as required.

Accordingly, in exemplary embodiments as illustrated in FIG. 9, the connecting step 350 may include welding a spar cap 48, 50 of the first portion 86 and a spar cap 51, 53 of the second portion together at the erection site. Further, such welding may include connecting an electrical connector 354 to a heating element 352. In some embodiments, electrical connector 354 may be a single continuous electrical connector 354. In other embodiments as illustrated, a plurality of discrete heating elements 352 may be provided. In these embodiments, electrical connector 354 may be moved along direction 355 and connected to a second heating element 352 after being disconnected from a first heating element 352.

Further, in exemplary embodiments as illustrated in FIG. 10, the connecting step 350 may include welding a blade segment 21 of the first portion 86 and a blade segment 21 of the second portion together at the erection site. Such welding may occur, for example, after welding of the spar caps(s) of the first and second portions 86, 88. Further, such welding may include connecting an electrical connector 354 to a heating element 352. In some embodiments as illustrated in FIG. 10, electrical connector 354 may be a single continuous electrical connector 354. In other embodiments, a plurality of discrete heating elements 352 may be provided. In these embodiments, electrical connector 354 may be moved along direction 355 and connected to a second heating element 352 after being disconnected from a first heating element 352.

To further facilitate welding of blade components of portions 86, 88 together, forces may be applied to the rotor blade 16 (such as the blade components thereof), such as at the joining location. Such force(s) may be applied before, during and/or after heating to facilitate bonding at a weld interface therebetween. Any suitable clamping mechanisms, bladders, or other suitable apparatus for providing a force. A force may be an external force (i.e. applied to an outer surface) or an internal force (i.e. applied to an inner surface). In some embodiments, both an external and an internal force may be applied counteract each other and hold the components generally stationary, preventing deflection thereof during welding.

Further, in exemplary embodiments, the rotor blade 16 (such as the blade components thereof), such as the thermoplastic resins thereof, may be cooled, such as after heating. Cooling allows the resins to re-solidify and the bonds between the blade components to be completed at the interface therebetween. In some embodiments, cooling is performed by simply allowing the rotor blade 16 (and portions 86, 88 thereof) to rest in an ambient temperature environment. In other embodiments, suitable active cooling techniques utilizing cooled air or another suitable gas or liquid may be utilized.

Methods for assembling rotor blades 16 in accordance with the present disclosure provide numerous advantages. In particular, methods in accordance with the present disclosure facilitate efficient and cost-effective rotor blade assembly 16 at erection sites. Such efficiency and cost-effectiveness is provided through use of fixtures 100 and transportation vehicles 200 during assembly as discussed herein, thus reducing the time and steps required for aligning the portions 86, 88 of the rotor blade 16. Further, such efficiency and cost-effectiveness is provided through use of welding techniques as discussed herein to join the portions 86, 88 together.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assembling a rotor blade, the method comprising:
   receiving a first portion of a rotor blade at an erection site, wherein the first portion is a root portion or a tip portion;
   receiving a second portion of the rotor blade at the erection site;
   aligning the first portion and the second portion at the erection site, the first portion and the second portion supported on a fixture system, the fixture system comprising a first cradle assembly supporting the first portion and a second cradle assembly supporting the second portion;
   welding a spar cap of the first portion and a spar cap of the second portion together at the erection site, the spar cap of the first portion and the spar cap of the second portion each comprising a thermoplastic resin; and
   connecting a blade segment of the first portion and a blade segment of the second portion together at the erection site, wherein at least one of the blade segment of the first portion or the blade segment of the second portion comprises a thermoset resin and a localized portion of a thermoplastic resin.

2. The method of claim 1, wherein the first portion is, when received at the erection site, supported on the first cradle assembly, at least a portion of the first cradle assembly supported on a transportation vehicle.

3. The method of claim 2, wherein, during the aligning step, the fixture system is at least partially supported on the transportation vehicle.

4. The method of claim 2, wherein, when the first portion is received at the erection site, at least a portion of the second cradle assembly is supported on the transportation vehicle.

5. The method of claim 2, wherein the transportation vehicle is a truck.

6. The method of claim 1, wherein the welding step comprises connecting an electrical connector to a resistive heating element disposed between the spar cap of the first portion and the spar cap of the second portion at a joining location to heat at least one of the spar cap of the first portion or the spar cap of the second portion, the electrical connector connected to a power source, the resistive heating element remaining at the joining location after welding.

7. The method of claim 6, wherein the welding step further comprises moving the electrical connector in a span-wise direction; and connecting the electrical connector to a second resistive heating element disposed between the spar cap of the first portion and the spar cap of the second portion at the joining location.

8. The method of claim 1, further comprising receiving the fixture system at the erection site separately from the first portion and the second portion, the fixture system at least partially supported on a transportation vehicle when received.

9. The method of claim 1, wherein the first portion is a root portion and the second portion is a tip portion.

10. The method of claim 1, wherein the connecting step comprises welding the blade segment of the first portion and the blade segment of the second portion together, the blade segment of the first portion and the blade segment of the second portion each comprising a thermoplastic resin.

11. A method for assembling a rotor blade, the method comprising:
    receiving a first portion of a rotor blade at an erection site, wherein the first portion is, when received at the erection site, supported on a first cradle assembly of a fixture system, the first cradle assembly supported on a transportation vehicle;
    receiving a second portion of the rotor blade at the erection site;
    aligning the first portion and the second portion at the erection site, the first portion and the second portion supported on the fixture system when aligned; and
    connecting a blade component of the first portion and a blade component of the second portion together at the erection site, wherein at least one of the blade component of the first portion or the blade component of the second portion comprises a thermoset resin and a localized portion of a thermoplastic resin.

12. The method of claim 11, wherein, during the aligning step, the fixture system is at least partially supported on the transportation vehicle.

13. The method of claim 11, wherein, when the first portion is received at the erection site, at least a portion of the second cradle assembly is supported on the transportation vehicle.

14. The method of claim 11, wherein the transportation vehicle is a truck.

15. The method of claim 11, wherein the first portion is a root portion and the second portion is a tip portion.

* * * * *